US012784182B2

(12) United States Patent
Lo et al.

(10) Patent No.: US 12,784,182 B2
(45) Date of Patent: Nov. 3, 2026

(54) METHOD FOR DETECTING DEFECTS OF A SEMICONDUCTOR SUBSTRATE

(71) Applicant: United Semiconductor (Xiamen) Co., Ltd., Xiamen (CN)

(72) Inventors: Ching-Shu Lo, Singapore (SG); Yan Cai, Singapore (SG); Tsung Che Lin, Singapore (SG); Qiao Lin Chen, Shamen City (CN); Wen Yi Tan, Xiamen (CN)

(73) Assignee: United Semiconductor (Xiamen) Co., Ltd., Xiamen (CN)

( * ) Notice: Subject to any disclaimer, the term of this patent is extended or adjusted under 35 U.S.C. 154(b) by 220 days.

(21) Appl. No.: 18/752,813

(22) Filed: Jun. 25, 2024

(65) Prior Publication Data

US 2025/0371701 A1 Dec. 4, 2025

(30) Foreign Application Priority Data

May 28, 2024 (CN) ......................... 202410671591.9

(51) Int. Cl.

| | |
|---|---|
| ***G06T 7/00*** | (2017.01) |
| ***G01N 21/95*** | (2006.01) |
| ***G06T 3/02*** | (2024.01) |
| ***G06T 5/30*** | (2006.01) |
| ***G06T 5/50*** | (2006.01) |

(Continued)

(52) U.S. Cl.

CPC ......... *G06T 7/001* (2013.01); *G01N 21/9501* (2013.01); *G06T 3/02* (2024.01); *G06T 5/30* (2013.01); *G06T 5/50* (2013.01); *G06T 5/70* (2024.01); *G06T 7/337* (2017.01); *G06T 7/90* (2017.01); *G06T 2207/10024* (2013.01);

(Continued)

(58) Field of Classification Search

CPC ........... G06T 7/001; G06T 7/90; G06T 7/337; G06T 3/02; G06T 5/30; G06T 5/50; G06T 5/70; G01N 21/9501

See application file for complete search history.

(56) References Cited

U.S. PATENT DOCUMENTS 10,509,254 B2 * 12/2019 Li ..................... G02F 1/133512

FOREIGN PATENT DOCUMENTS

| | | | | |
|---|---|---|---|---|
| CN | 102854196 B | * | 6/2014 | |
| KR | 20070002249 A | * | 1/2007 | ............ H10P 74/203 |

OTHER PUBLICATIONS

Zhenxin, et al. (Computer English Translation of Chinese Patent No. CN102854196 a). (Year: 2013).*

* cited by examiner

*Primary Examiner* — Daniel G Mariam
(74) *Attorney, Agent, or Firm* — Winston Hsu

(57) ABSTRACT

The invention relates to a method for detecting defects of a semiconductor substrate, which comprises the following steps: providing a substrate, wherein the substrate comprises at least one alignment mark; capturing the substrate to obtain a color image, wherein the color image comprises at least one first alignment mark, inputting the color image into a system, and respectively retaining a R value, a G value and a B value of the color image, so as to respectively convert the color image into a red image, a green image and a blue image, and carry out a color difference comparison step, wherein the red image, the green image and the blue image are respectively compared with a standard red image, a standard green image and a standard blue image, and finding the color difference regions on the red image, the green image and the blue image.

14 Claims, 7 Drawing Sheets

(51) Int. Cl.
*G06T 5/70* (2024.01)
*G06T 7/33* (2017.01)
*G06T 7/90* (2017.01)

(52) U.S. Cl.
CPC ............... *G06T 2207/30148* (2013.01); *G06T 2207/30204* (2013.01)

METHOD FOR DETECTING DEFECTS OF A SEMICONDUCTOR SUBSTRATE

BACKGROUND OF THE INVENTION

1. Field of the Invention

The invention relates to the field of semiconductors, in particular to a method for detecting defects of a semiconductor substrate or a photomask.

2. Description of the Prior Art

With the development of semiconductor technology, the size of various components is getting smaller and smaller, and the density of components is also increasing gradually, so the defect detection steps in various processes are more important. Defects in semiconductor manufacturing process will not only affect the current product quality, but also affect the yield of subsequent processes or other related products. Therefore, it is one of the technologies that need to be developed in this field to find out the defects of semiconductor components in real time in the semiconductor manufacturing process.

However, as mentioned above, the size of semiconductor devices is gradually shrinking and the number of devices per unit area is more, so it will take a lot of time to detect defects manually, which is not conducive to the production efficiency of products. Therefore, it has become the current development trend to quickly detect the defects of semiconductor products by non-manual and other mechanized methods. However, the current semiconductor defect detection technology still needs to be improved, such as misjudging the defect position or not recognizing the difference between defect and noise, which will lead to the final defect detection result not being consistent with the actual defect position and resulting in errors.

SUMMARY OF THE INVENTION

The invention relates to a method for detecting defects of a semiconductor substrate, which comprises the following steps: providing a substrate, wherein the substrate comprises at least one alignment mark, capturing the substrate to obtain a color image, wherein the color image comprises at least one first alignment mark, inputting the color image into a system, and respectively retaining a red value (R value), a green value (G value) and a blue value (B value) of the color image, so as to respectively convert the color image into three images, namely a red image, a green image and a blue image, and carry out a color difference comparison step, wherein the red image, the green image and the blue image are respectively compared with a standard red image, a standard green image and a standard blue image, and color difference regions on the red image, the green image and the blue image are found out.

The invention is characterized by providing a method for detecting defects of a semiconductor substrate or a photomask. The method includes four steps, namely: 1. alignment step, 2. affine transformation step, 3. color difference comparison step 4. noise filtering step. Using the above four steps, the photographed color images of the semiconductor substrate or photomask can be converted into color values (such as R value, G value and B value) arranged in a plurality of coordinate grids, and the color values in each coordinate grid are compared with the values of a standard image respectively. Therefore, the manufacturer can find out the defects that are not easy to find in the case of specific colors, and it has better accuracy than the gray-scale color difference comparison method. In addition, in the noise filtering step, the erosion step and the dilation step are performed in sequence, which is helpful to effectively eliminate noise and avoid misjudgment of the defect detection system. To sum up, the invention has the advantages of saving labor cost, being compatible with the prior art, improving product yield and the like.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

In order to make the following easier to understand, readers can refer to the drawings and their detailed descriptions at the same time when reading the present invention. Through the specific embodiments in the present specification and referring to the corresponding drawings, the specific embodiments of the present invention will be explained in detail, and the working principle of the specific embodiments of the present invention will be expounded. In addition, for the sake of clarity, the features in the drawings may not be drawn to the actual scale, so the dimensions of some features in some drawings may be deliberately enlarged or reduced.

DETAILED DESCRIPTION

To provide a better understanding of the present invention to users skilled in the technology of the present invention, preferred embodiments are detailed as follows. The preferred embodiments of the present invention are illustrated in the accompanying drawings with numbered elements to clarify the contents and the effects to be achieved.

Please note that the figures are only for illustration and the figures may not be to scale. The scale may be further modified according to different design considerations. When referring to the words "up" or "down" that describe the relationship between components in the text, it is well known in the art and should be clearly understood that these words refer to relative positions that can be inverted to obtain a similar structure, and these structures should therefore not be precluded from the scope of the claims in the present invention.

Although the present invention uses the terms first, second, third, etc. to describe elements, components, regions, layers, and/or sections, it should be understood that such elements, components, regions, layers, and/or sections should not be limited by such terms. These terms are only used to distinguish one element, component, region, layer and/or block from another element, component, region, layer and/or block. They do not imply or represent any previous ordinal number of the element, nor do they represent the arrangement order of one element and another element, or the order of manufacturing methods. Therefore, the first element, component, region, layer or block discussed below can also be referred to as the second element, component, region, layer or block without departing from the specific embodiments of the present invention.

The term “about” or “substantially” mentioned in the present invention usually means within 20% of a given value or range, such as within 10%, or within 5%, or within 3%, or within 2%, or within 1%, or within 0.5%. It should be noted that the quantity provided in the specification is approximate, that is, the meaning of “about” or “substantially” can still be implied without specifying “about” or “substantially”.

The terms “coupling” and “electrical connection” mentioned in the present invention include any direct and indirect means of electrical connection. For example, if the first component is described as being coupled to the second component, it means that the first component can be directly electrically connected to the second component, or indirectly electrically connected to the second component through other devices or connecting means.

Although the invention of the present invention is described below by specific embodiments, the inventive principles of the present invention can also be applied to other embodiments. In addition, in order not to obscure the spirit of the present invention, specific details are omitted, and the omitted details are within the knowledge of those with ordinary knowledge in the technical field.

Figure 1:
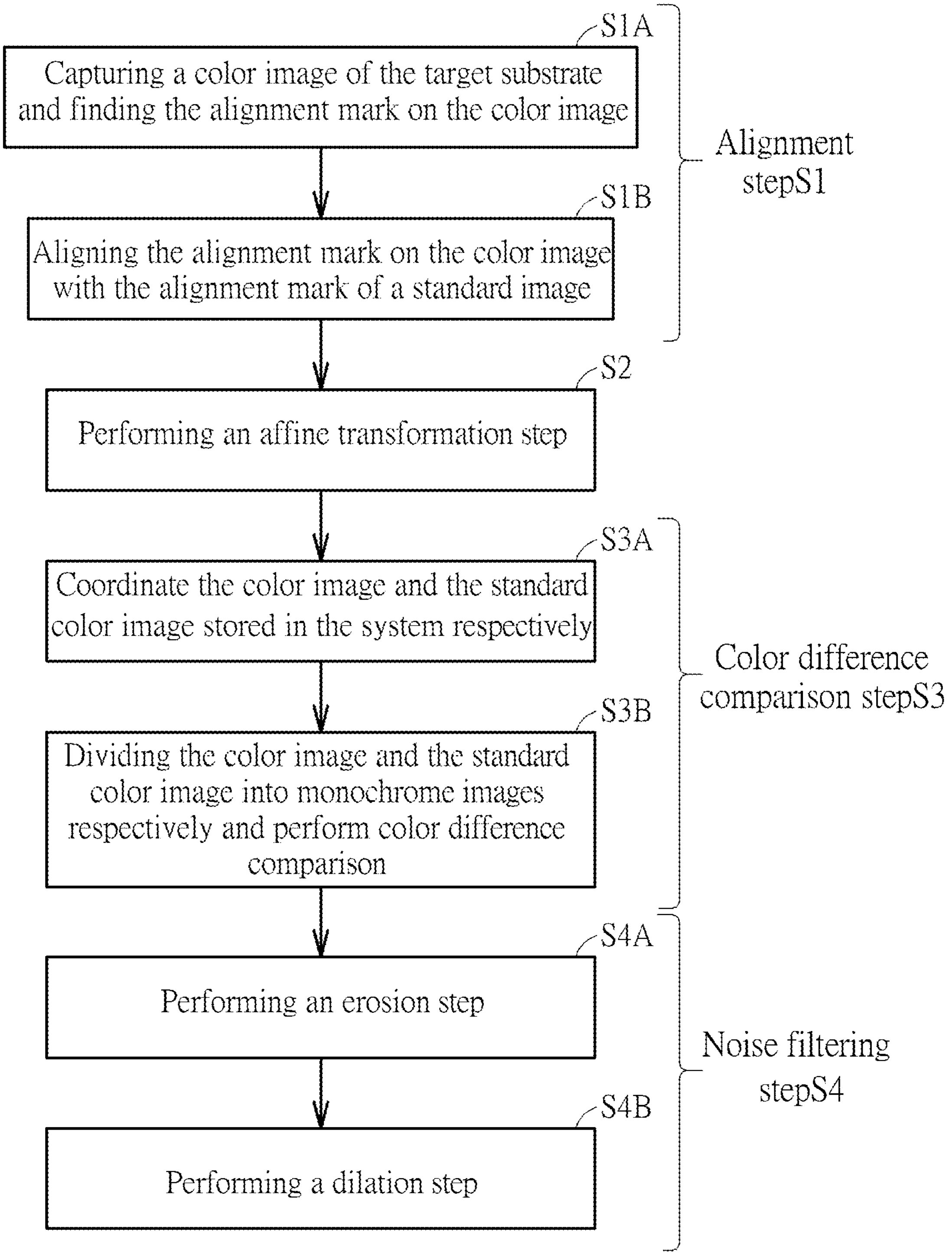
FIG. 1 is a flowchart of a method for detecting defects of a semiconductor substrate or a photomask provided by the present invention.

Please refer to FIG. 1, which shows a flowchart of a method for detecting defects of a semiconductor substrate or a photomask provided by the present invention. As shown in FIG. 1, the method for detecting defects of a semiconductor substrate or a photomask provided by the present invention sequentially includes an alignment step S1, an affine transformation step S2, a color difference comparison step S3 and a noise filtering step S4. The alignment step S1 corresponds to the schematic diagram shown in FIG. 2 below, and the alignment step S1 further includes two sub steps, namely, step S1A: capturing a color image of the target substrate and finding the alignment mark on the color image, and step S1B: aligning the alignment mark on the color image with the alignment mark of a standard image. The affine transformation step S2 corresponds to the schematic diagram shown in FIG. 3 below. The color difference comparison step S3 corresponds to the schematic diagram shown in FIGS. 4-5 below. The color difference comparison step S3 includes two sub steps, namely, step S3A: coordinate the color image and the standard color image stored in the system respectively, and step S3B: dividing the color image and the standard color image into monochrome images respectively and perform color difference comparison. The noise filtering step S4 corresponds to the schematic diagram shown in FIGS. 6-7 below. The noise filtering step S4 includes two sub steps, namely S4A: performing an erosion step and S4B: performing a dilation step. The above steps will be described in sequence in the following paragraphs and drawings.

Figure 2:
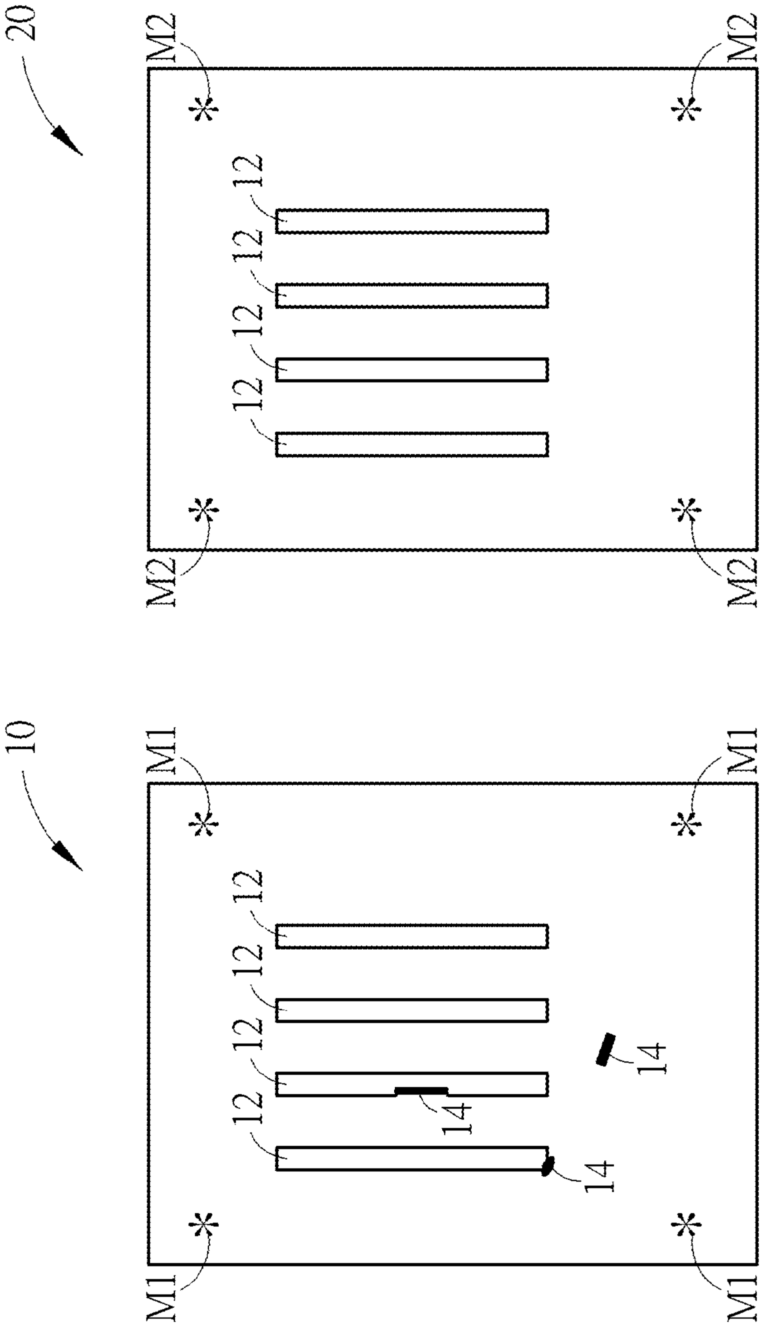
FIG. 2 is a schematic diagram showing a captured color image and a standard image in the method of the present invention.

Please refer to FIG. 2, which shows a captured image and a standard image in the method of the present invention. As shown in FIG. 2, in the semiconductor manufacturing process, a target substrate (not shown) is provided, and the target substrate includes patterns and a plurality of alignment marks (not shown). A photo of the target substrate is taken and stored in a system (such as a computer) to obtain a color image 10 in the system, wherein the color image 10 shows the surface of the target substrate, and the color image 10 may include a pattern 12 or a material layer, and the material layer or the pattern 12 may include defects 14, and the color image 10 also includes several first alignment marks M1. The target substrate mentioned here may be a silicon wafer in a semiconductor process, a substrate on which a material layer has been formed, or various types of masks. Therefore, from the color image 10, the surface of the target substrate may be made of silicon, or the surface of various material layers, or the surface containing patterns (such as various electronic components) 12. The material layer here may include various dielectric layers such as silicon oxide, silicon nitride and silicon oxynitride, conductive layers such as metal, amorphous silicon, polysilicon, metal silicide layer and alloy layer, and structural pattern layers such as fin structure and diffusion region, but the present invention is not limited to this. All the above structures are within the scope of the present invention.

The target substrate also contains alignment marks, which can be cross-shaped marks or star-shaped marks, and the target substrate can contain several alignment marks distributed on it. Preferably, the alignment marks are arranged at four corners (i.e. upper left corner, upper right corner, lower left corner and lower right corner) on the target substrate, and the alignment marks at the four corners can be connected into a rectangular shape. Next, the alignment marks in the color image 10 obtained after capturing the target substrate are defined as the first alignment mark M1.

In addition, the color image 10 obtained by capturing will be compared with a standard color image 20, which refers to the color image obtained by capturing a almost perfect (or nearly flawless) target substrate. For example, a substrate sample with good quality and no defects after passing the test is selected from a plurality of substrate samples made by the manufacturer, and this sample is captured, and the obtained image is the standard color image 20. Similarly, because the original target substrate contains the alignment mark, the standard color image 20 will also contain the alignment mark, and the alignment marks of the standard color image 20 are defined as the second alignment marks M2. Ideally, the color image 10 should be the same as or almost the same as the standard color image 20, which means that the substrate surface of the color image 10 photographed in this process is close to a perfect state. However, if defects are generated on the surface of the substrate in this process, the color and shape conditions of some positions of the captured color image 10 may be different from those of the standard color image 20, which means that these positions may be the positions where the defects 14 are generated. In some embodiments, the defects 14 may be too small to be easily detected, so the invention provides a defect detection method to find out the possible location of the defect in a mechanized way, as described in the following paragraph in detail.

Figure 3:
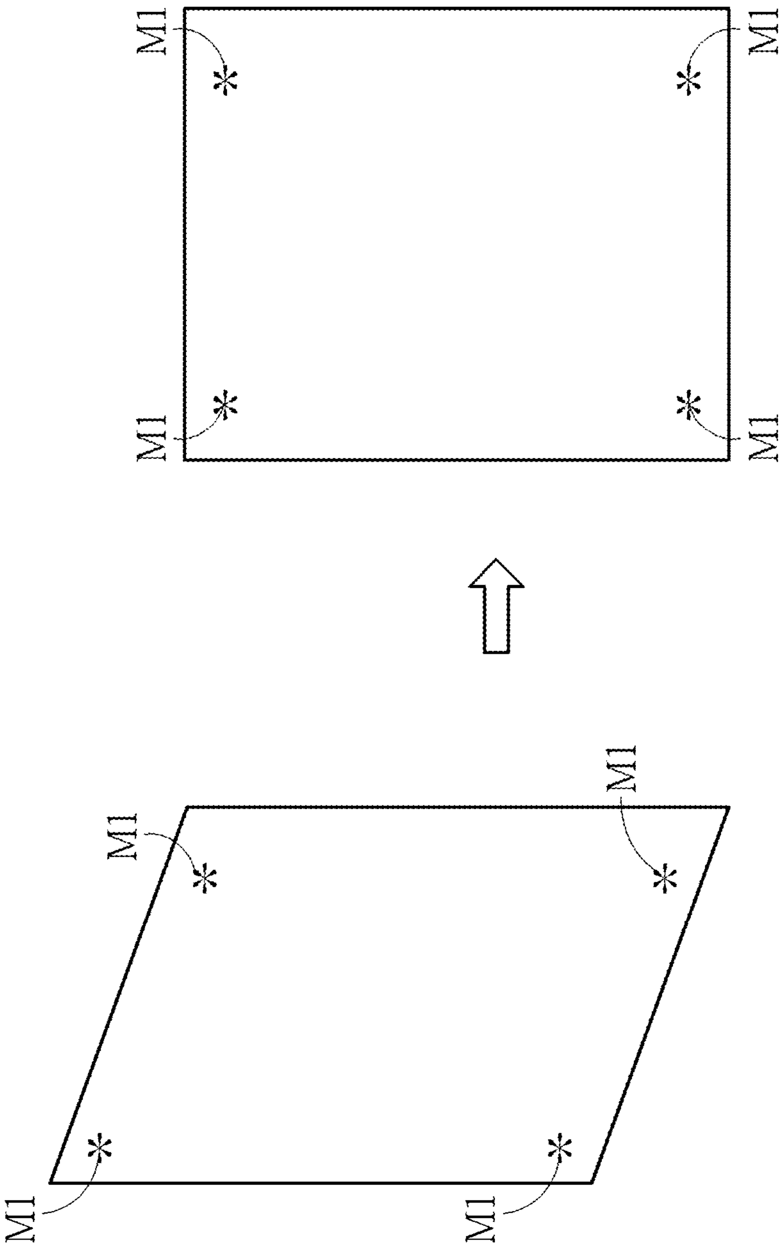
FIG. 3 is a schematic diagram showing the affine transformation step in the method of the present invention.

Next, please refer to FIG. 3, which shows a schematic diagram of the affine transformation step in the method of the present invention. The color image 10 is analyzed in the system, in which the color image 10 shows the surface condition of the substrate in the current process. In the above-mentioned process of capturing the color image 10, the position of the cameras will affect the capturing angle, so it may cause the situation that the alignment marks M1 at the four corners of the color image 10 are not arranged in a rectangle as shown in FIG. 3. Therefore, before comparing the color image 10 with the standard color image 20, an affine transformation step S2 can be performed to correct the first alignment marks M1 in four corners of the color image 10 into rectangular shapes, which is convenient for the subsequent comparison step.

Figure 4:
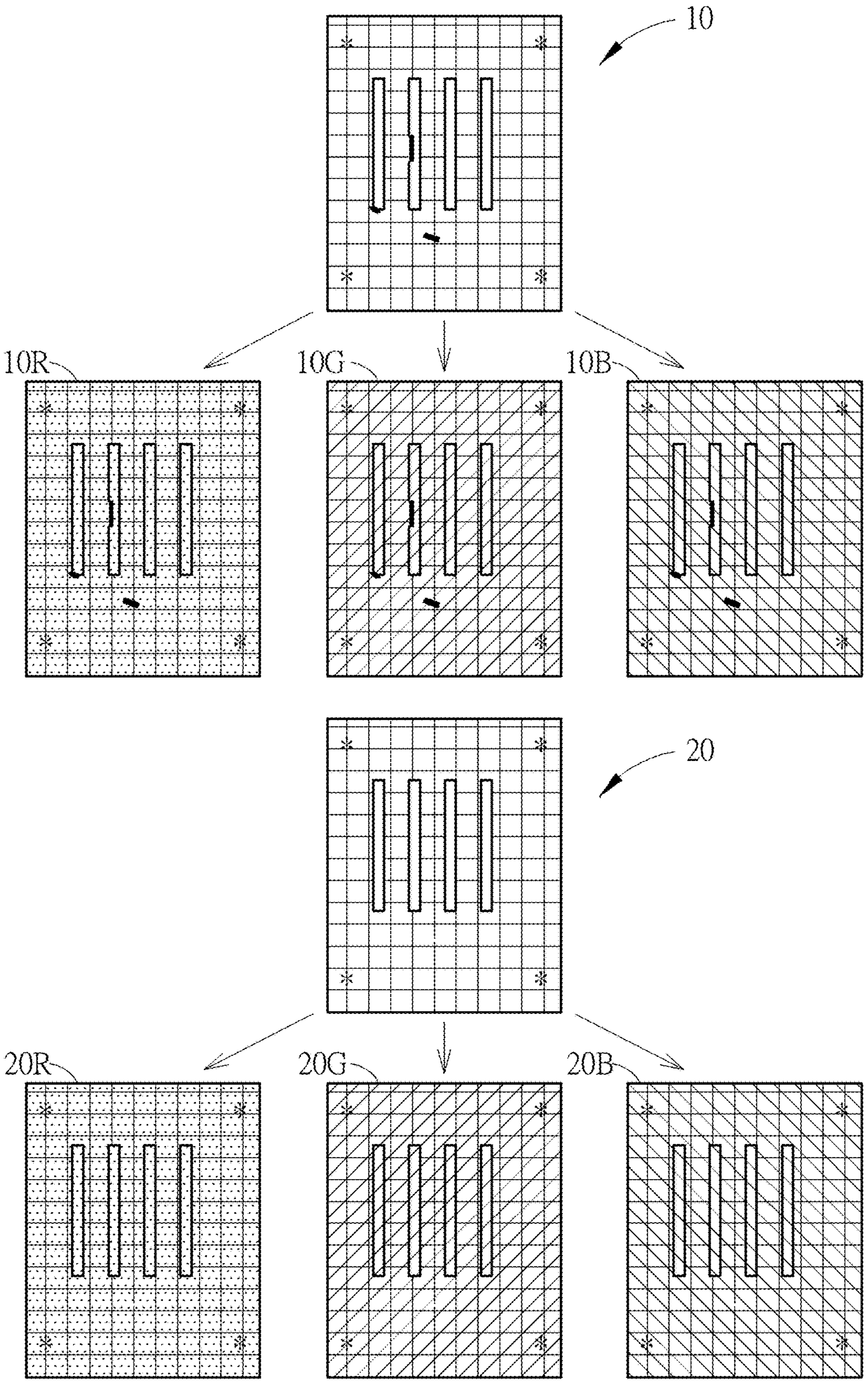
FIG. 4 is a schematic diagram showing the color image coordinate and split into the red image, the green image and the blue image in the color difference comparison step in the method of the present invention.
Figure 5:
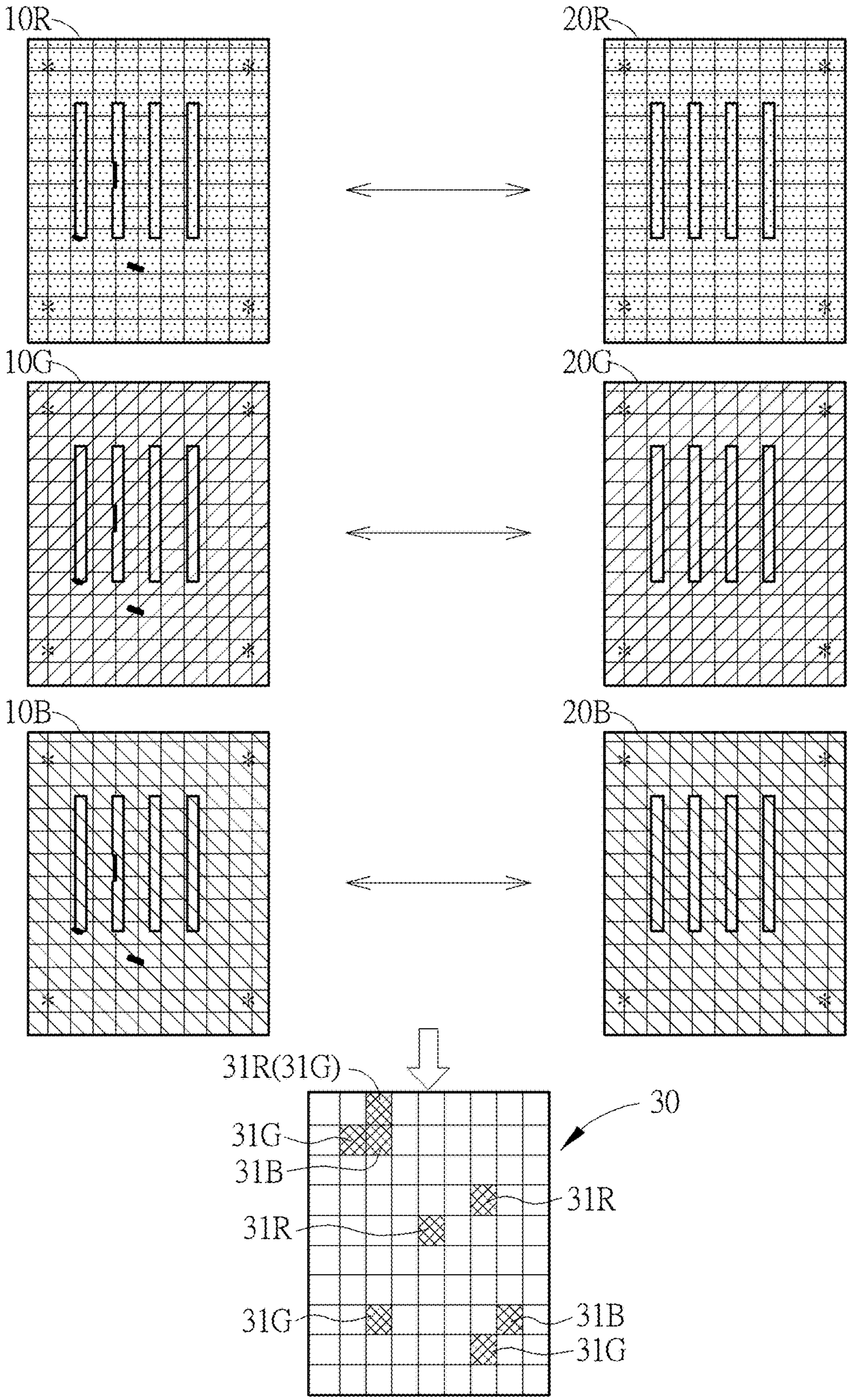
FIG. 5 is a schematic diagram showing the color difference comparison of different color images in the color difference comparison step in the method of the present invention.

Next, please refer to FIG. 4 and FIG. 5. FIG. 4 shows a schematic diagram of the color image being coordinated and split into a red image, a green image and a blue image in the color difference comparison step in the method of the present invention. As shown in FIG. 4, the color image 10 input into the system is coordinated, and the color image 10 is divided into a red image 10R, a green image 10G and a blue image 10B. The coordinate means to mark the coordinate or grid pattern on the color image 10 displayed in the system, so as to define the position information of the pattern conveniently. Here, the step of dividing the color image 10 into three images, namely, the red image 10R, the green image 10G and the blue image 10B, means that the color values contained in the color image 10 (generally including the R value, the G value and the B value, which are recognized as the red value, the green value and the blue value respectively) are reserved to the red image 10R, the green image 10G and the blue image 10B. In other words, take the red image 10R as an example, in which different positions on each coordinate only contain the red value (R value), and the R value of different coordinates may be different, but the G value and B value of all positions are 0. Similarly, in the green image 10G, all coordinate positions only contain the green value (G value), and the G value may be different in different coordinates, but the R value and B value of all positions are 0. In the blue image 10B, all coordinate positions only contain the blue value (B value), and the B value of different coordinates may be different, but the R value and G value of all positions are 0.

It is worth noting that the size of each grid area in the coordinate system here, that is, the unit length on the coordinate axis can be adjusted according to the manufacturer's requirements. If the unit length of the coordinate axis is smaller, the accuracy of defect detection will be higher, and it will be easier to find out subtle defects, but it will also increase the time spent on comparison step. On the other hand, if the unit length of the coordinate axis is larger, the accuracy of defect detection is lower, and it is not easy to find subtle defects, but it will also reduce the time spent on comparison step. Therefore, the manufacturer can adjust the unit length of the coordinate axis as required, and the invention is not limited to this.

Similarly, in FIG. 4, it is necessary to input the standard color image 20 into the system, and coordinate and dividing the image file into three images, namely, the standard red image 20R, the standard green image 20G and the standard blue image 20B. The steps are the same as those described in FIG. 4 above, and will not be repeated here.

In addition, in some embodiments, the standard red image 20R, the standard green image 20G and the standard blue image 20B will be stored in the system as templates of the standard image, which is convenient for manufacturers to compare the image files of different substrate samples repeatedly. But the present invention is not limited thereto.

As shown in FIG. 5, FIG. 5 shows a schematic diagram of color difference comparison of different color images in the color difference comparison step in the method of the present invention. After the steps shown in FIG. 4 are completed, next, a color difference comparison step S3 is performed, and the red image 10R, the green image 10G and the blue image 10B stored in the system are compared with the standard red image 20R, the standard green image 20G and the standard blue image 20B respectively. Taking the red image as an example, the comparison method can mark coordinate data for each coordinate position. For example, the horizontal axis of the red image contains M coordinates and the vertical axis contains N coordinates, so each coordinate can be defined as (1,1), (1,2), (1,3), (1,Y), (2,1), (2,2) . . . (M,N). Then, the coordinates at the same coordinate position are compared in color difference, for example, whether the color difference between the red image 10R and the standard red image 20R at each coordinate such as (1,1), (1,2) and (1,3) . . . is within an allowable range defined by the manufacturer in advance, if the color difference between the two coordinate positions is within the allowable range, it means that the surface state of the current process in this region is close to the ideal state, therefore, the probability of defects in this region is low. On the other hand, if the color difference between the two coordinate positions is greater than the allowable range, it means that the surface state of the current process in this region is different from the ideal state, so the probability of defects in this region is high.

As described above, the color difference of each coordinate position of the red image 10R and the standard red image 20R is compared in sequence in the system. Similarly, the color difference of each coordinate position of the green image 10G and the standard green image 20G is compared in sequence in the system, and the color difference of each coordinate position of the blue image 10B and the standard blue image 20B is compared in sequence in the system. In the present invention, firstly, the coordinate positions found out exceed the allowable range of color difference in the color difference comparison step of red image are defined as red defects. Similarly, in the color difference comparison step of green image, the coordinate positions found out exceed the allowable range of color difference are defined as green defects, and in the color difference comparison step of blue image, the coordinate positions found out exceed the allowable range of color difference are defined as blue defects. The red defect, the green defect and the blue defect found in the red image, the green image and the blue image can be together marked on a defect coordinate axis 30. FIG. 5 shows the above-mentioned red defect 31R, green defect 31G and blue defect 31B. In other words, the defect coordinate axis 30 contains the positions where defects may occur after the three images, namely the red image 10R, the green image 10G and the blue image 10B, are respectively compared with the standard red image 20R, the standard green image 20G and the standard blue image 20B through the color difference comparison step S3.

In the following steps, the manufacturer can further inspect the positions of the defects 31R, 31G and 31B on the defect coordinate axis 30, for example, by surface observation or profile scanning to confirm whether the defects actually occur at the positions corresponding to these coordinates. It is worth noting that if the red defect 31R, the green defect 31G and the blue defect 31B found after the above red, green and blue color difference comparison step S3 overlap at some positions, for example, a plurality of red defects 31R found in the red image color difference comparison step and a plurality of green defects 31G found in the green image color difference comparison step overlap at the same coordinate position, for example, the red defect 31R and the green defect 31G are both included at the coordinate (3,6), it means that the probability of actual defects in this coordinate position will increase. Therefore, the manufacturer can find out the position of the defect on the surface of the substrate immediately, and can adjust the process accordingly, so as to achieve the function of improving the yield of the process.

Figure 6:
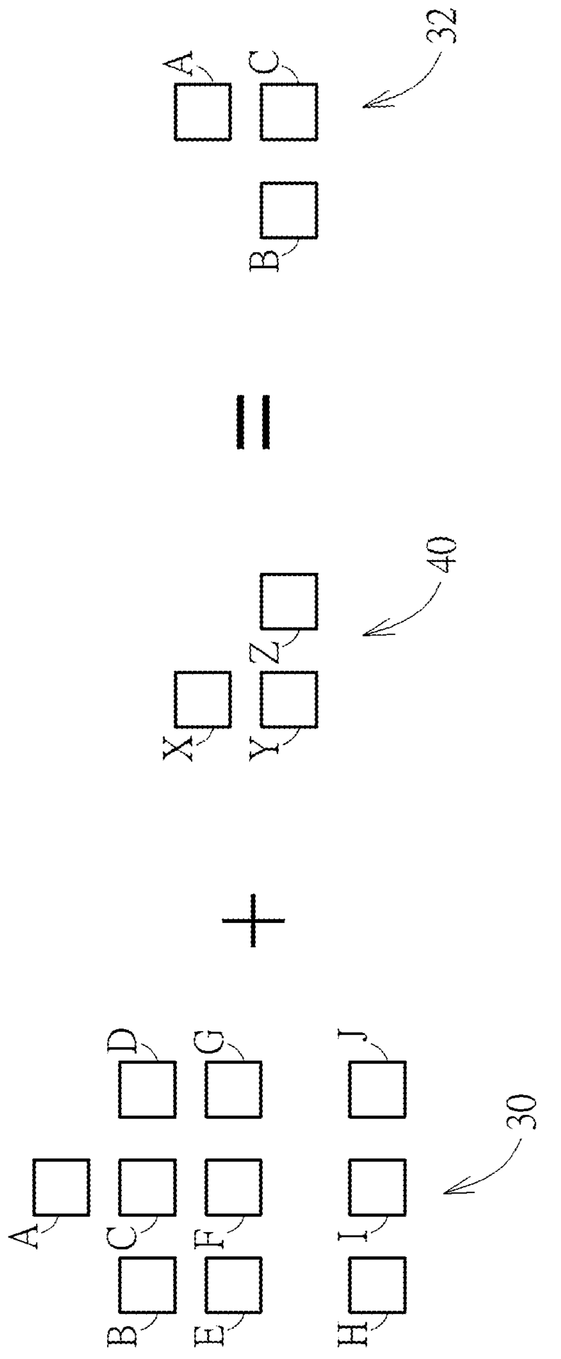
FIG. 6 shows an example of the erosion step in the noise filtering step in the method of the present invention.

After the color difference comparison step S3, the coordinate positions of the red defect 31R, the green defect 31G and the blue defect 31B are found and marked on the defect coordinate axis 30. In some embodiments of the present invention, a noise filtering step S4 is further performed. Specifically, the noise filtering step S4 of the present invention includes sequentially performing an erosion step shown in FIG. 6 and a dilation step shown in FIG. 7. FIG. 6 shows an example of the erosion step in the noise filtering step in the method of the present invention. As shown in FIG. 6, the coordinates of the production position of defects (such as the above-mentioned red defect 31R, green defect 31G and blue defect 31B) are marked on the defect coordinate axis 30, but these defect coordinates may contain noise. If each defect coordinate is directly inspected in sequence without noise filtering, it will increase the time for the manufacturer to inspect the substrate surface, which is not conducive to the production efficiency of the process.

In this embodiment, a method for eliminating noise is provided. As shown in FIG. 6, it is assumed that a defect coordinate axis 30 contains a plurality of positions where defects occur. Here, for simple description, it is assumed that a defect coordinate axis 30 contains a plurality of defects (such as a red defect 31R, a green defect 31G and a blue defect 31B) arranged in the shape shown in FIG. 6. The defect coordinate positions on the defect coordinate axis 30 are defined as defect grids A to J (including defect grid A, defect grid B, defect grid C, defect grid D, defect grid E, defect grid F, defect grid G, defect grid H, defect grid I and defect grid J in detail), where the defect grids A to J are the coordinate positions of defects of various colors found by the color difference comparison step S3, and are presented in the form of grids in FIG. 6. However, it can be understood that the defect grids shown in FIG. 6 is only an example, and the shapes of the defect grids found in the actual semiconductor manufacturing process may be different, and the present invention is not limited to the grid pattern shown in FIG. 6. In this embodiment, in addition to finding out the defect position marked on the defect coordinate axis 30, it is also necessary to define a structural unit 40, wherein the structural unit 40 is composed of a plurality of grids, and the size of a single grid is the same as that of the above-mentioned defect grids A to J. The number of grids contained in the structural unit 40 and the shape of the arrangement can be determined according to the requirements of the manufacturer. Taking this embodiment as an example, the selected structural unit 40 contains three grids, which are defined as grid X, grid Y and grid Z respectively, and the grids X, Y and Z are arranged in an L-shape. However, it can be understood that the shape and the number of grids included in the structural units 40 of the present invention are not limited to this, and can be adjusted according to actual needs, for example, they can be arranged in rectangular, circular or other shapes according to needs. In addition, the structural unit 40 contains at least two grids, so as to have the effect of filtering noise.

In the erosion step shown in FIG. 6, any grid of structural unit 40 is sequentially compared with all defect grids (namely defect grids A to J) contained on defect coordinate axis 30. When the grid selected by structural unit 40 overlaps with one defect grid contained on defect coordinate axis 30, if all other grids on structural unit 40 also overlap with other defect grids contained on defect coordinate axis 30, the defect on defect coordinate axis 30 will be retained at this time. To illustrate with practical examples, it is assumed that the grid X in the selected structural unit 40 is overlapped with the defect grids A to J on the defect coordinate axis 30 one by one (when the grid X overlaps with the defect grid B, the grid Y and the grid Z in the structural unit 40 also overlap with the defect grid E and the defect grid F on the defect coordinate axis 30 respectively, and when the above conditions are met, the defect grid B on the defect coordinate axis 30 (i.e. the overlapped defect grid) is retained. On the contrary, for another example, when the grid X overlaps with the defect grid D, the grid Y in the structural unit 40 also overlaps with the defect grid G at this time, but the grid Z will exceed the range of the defect coordinate axis 30, so the grid Z will not overlap with any defect grid of the defect coordinate axis 30, that is, it will overlap with a blank area. At this time, the defect grid D on the defect coordinate axis 30 will not be retained, that is, the defect grid D will be deleted. Therefore, if the grid X of the structural unit 40 is selected for comparison, after the above erosion step, only the defect grids A, B and C remain on the defect coordinate axis 30, and others defect grids are deleted.

It is worth mentioning that although the grid X of the structural unit 40 is selected as the overlapping object in the above erosion step, it is not limited to selecting the grid X here, but it is also possible to select the grid Y or the grid Z, and the same result can be obtained.

In the erosion step, only when all the grids of the structural unit 40 overlap with the defect grid of the defect coordinate axis 30 will the defect grid remain. In other words, only the defect grids of the intersection of the structural unit 40 and the defect coordinate axis 30 are retained. After the erosion step, the remaining defect coordinate axis is defined as the defect coordinate axis 32.

Figure 7:
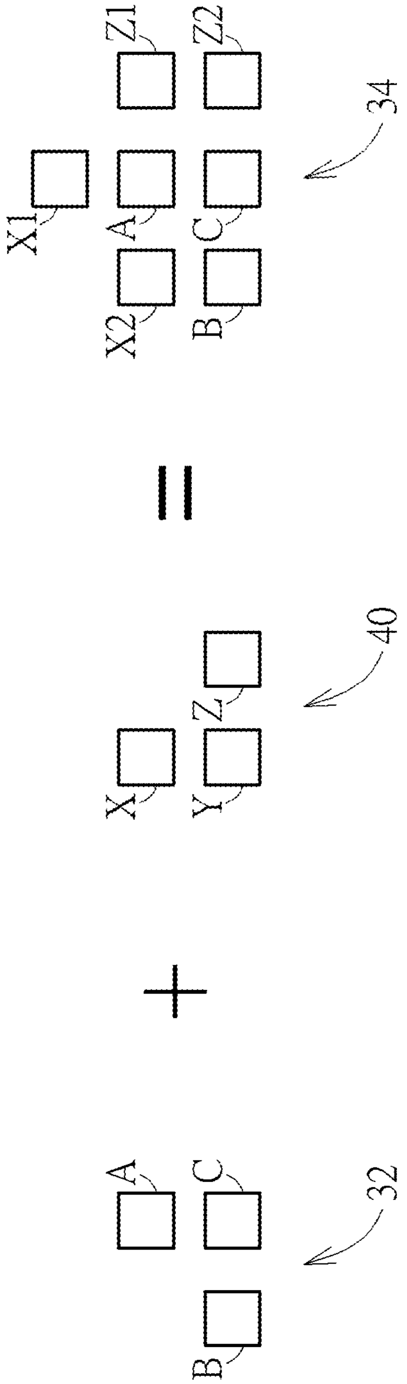
FIG. 7 is a schematic diagram showing an example of the dilation step in the noise filtering step in the method of the present invention.

Next, please refer to FIG. 7, which shows an example of the dilation step in the noise filtering step in the method of the present invention. In the dilation step shown in FIG. 7, any grid of the structural unit 40 is sequentially compared with the positions of all the defect grids A to C contained on the defect coordinate axis 32. When the selected grid of the structural unit 40 overlaps with one of the defect grids contained on the defect coordinate axis 32, other grids of the structural unit 40 overlapping with the blank area will be retained. To illustrate with a practical example, suppose that the grid Y in the selected structural unit 40 is overlapped with the defect grids A to C on the defect coordinate axis 32 one by one. When the grid Y overlaps with the defect grid A, the grid X in the structural unit 40 will remain on the defect coordinate axis 32, although it does not overlap with any defect grid (that is, it overlaps with a blank area), that is, a new defect grid X1 will be added on the defect coordinate axis 32 corresponding to the grid X position of the structural unit. Similarly, although the grid Z in the structural unit 40 does not overlap with any defect grid (i.e., it overlaps with the blank area), it will be retained on the defect coordinate axis, that is, a new defect grid Z1 will be added on the defect coordinate axis 32 corresponding to the grid Z position of the structural unit 40. Next, the grid Y of the structural unit 40 is sequentially overlapped with the remaining defect grids B and C on the defect coordinate axis 32, and the above dilation step is repeated. The final result, as shown in the right of FIG. 7, is defined as the defect coordinate axis 34.

It is worth mentioning that although the grid Y of the structural unit 40 is selected as the overlapping object in the above erosion step, it is not limited to selecting the grid Y here, but it is also possible to select the grid X or the grid Z, and the same result can be obtained.

In the dilation step, when any grid of the structural unit 40 overlaps with the defect grid of the defect coordinate axis 32, not only will the defect grid be retained, but also a new defect grid will be added in the adjacent blank area. In other words, the defect GRID of the union of the structural unit 40 and the defect coordinate axis 32 will be preserved.

After the erosion step and dilation step in FIGS. 6 and 7, it can be found that in the defect coordinate axis 34, compared with the defect grids A to J in the initial defect coordinate axis 30, a part of the defect grids H, I and J are finally disappeared. This means that in the step of erosion and dilation in sequence, a part of defect grids can be deleted, which are usually far away from other defect grids (that is, they will not be adjacent to the main defect grid). According to the applicant's experimental results, the probability that these deleted defect grids are confirmed as noise is high, so in the present invention, these defect grids are deleted by erosion step and dilation step in advance to improve the efficiency and productivity of semiconductor defect detection.

In addition, the noise filtering step S4 in the present invention includes the steps shown in FIG. 6 and FIG. 7 in sequence, rather than the steps shown in FIG. 6 or FIG. 7 alone. In addition, in the steps of FIG. 6 and FIG. 7, the shapes of the selected structural units 40 should be the same. After the steps shown in FIGS. 6 and 7, the final defect coordinate axis 34 will be compared with the original defect coordinate axis 30, and if there are deleted coordinate axes (grids), these grids will be regarded as noise.

Based on the above description and drawings, the present invention provides a method for detecting defects in a semiconductor substrate, which comprises providing a substrate with at least one alignment mark, capturing the substrate to obtain a color image 10, wherein the color image 10 includes at least one first alignment mark M1, inputting the color image 10 into a system, and keeping the red value (R value), green value (G value) and blue value (B value) of the color image 10 respectively, so as to respectively convert the color image 10 into three images, namely a red image 10R, a green image 10G and a blue image 10B, and perform a color difference comparison step S3, wherein the red image 10R, the green image 10G and the blue image 10B are respectively compared with a standard red image 20R, a standard green image 20G and a standard blue image 20B, and the color difference regions on the red image 10R, the green image 10G and the blue image 10B (namely, the defect 31 in FIG. 5) are found.

In some embodiments of the present invention, the standard red image 20R, the standard green image 20G and the standard blue image 20B each contain at least one second alignment mark M2.

In some embodiments of the present invention, an alignment step S1 is further included, in which at least one first alignment mark M1 on the red image 10R, the green image 10G and the blue image 10B is aligned with at least one second alignment mark M2 respectively included in the standard red image 20R, the standard green image 20G and the standard blue image 20B.

In some embodiments of the present invention, the alignment step S1 is performed before the color difference comparison step S3.

In some embodiments of the present invention, the substrate contains four alignment marks, and the connecting lines of the four alignment marks are rectangular or square.

In some embodiments of the present invention, an affine transformation step S2 is further included, and the affine transformation step S2 includes correcting the connecting lines of the four first alignment marks M1 on the color image to be rectangular or square.

In some embodiments of the present invention, the alignment step S1 is performed first, then the affine transformation step S2 is performed, and then the color difference comparison step S3 is performed.

In some embodiments of the present invention, the color difference comparison step S3 further includes defining a plurality of coordinate regions (i.e., the grids in FIG. 4) on the red image 10R and the standard red image 20B, and performing step A: sequentially comparing whether the color difference of the red values (R values) of the coordinate regions on the red image 10R and the corresponding coordinate regions on the standard red image 20R exceeds a set value, and if the result of the above step A is yes, marking the coordinate region as a red defect grid 31, and if the result of the above step A is no, mark the coordinate region as a safe region.

In some embodiments of the present invention, the color difference comparison step S3 further includes defining a plurality of coordinate regions (i.e., the grids in FIG. 4) on the green image 10G and the standard green image 20G respectively, and performing step B: sequentially comparing whether the color difference of the green values (G values) of the coordinate regions on the green image 10G and the corresponding standard green image 20G exceeds a set value, if the result of the above step B is yes, marking the coordinate region as a green defect grid 31, and if the result of the above step B is no, mark the coordinate region as a safe region.

In some embodiments of the present invention, the color difference comparison step further includes defining a plurality of coordinate regions (i.e., the grids in FIG. 4) on the blue image 10B and the standard blue image 20B, and performing step C: sequentially comparing whether the color difference of the blue values (B values) of the coordinate regions on the blue image 10B and the corresponding standard blue image 20B exceeds a set value, if the result of the above step C is yes, marking the coordinate region as a blue defect grid 31, and if the result of the above step C is no, mark the coordinate region as a safe region.

In some embodiments of the present invention, after the above steps A, B and C are completed, it further includes arranging the red defect grid 31, the green defect grid 31 and the blue defect grid 31 in a coordinate shape to form a defect coordinate axis 30, and performing a noise filtering step S4 to remove one or more of the defect grids 31 in the defect coordinate axis 30.

In some embodiments of the present invention, the noise filtering step S4 further comprises an erosion step S4A and a dilation step S4B in sequence.

In some embodiments of the present invention, the erosion step includes selecting a structural unit 40, which is composed of a plurality of grids (for example, X, Y, Z), sequentially overlapping and comparing any one of the grid of the structural unit 40 with each defect grid 31 of the defect coordinate axis 30 (the grids 31 shown in FIG. 5, also corresponding to the defect grids A to J in FIG. 6), the intersection grids of the defect coordinate axis 30 and the structural unit 40 are reserved, and the non-intersection grids of the defect coordinate axis 30 and the structural unit 40 are deleted, and the defect coordinate axis 30 after the non-intersection grids deleted is defined as a first defect coordinate axis 32.

In some embodiments of the present invention, the dilation step includes sequentially overlapping and comparing any one of a plurality of grids (X, Y, Z) of the structural unit 40 with each defect grid (A-C in FIG. 7) of the first defect coordinate axis 32, and keeping the union grids of the first defect coordinate axis 32 and the structural unit 40.

In some embodiments of the present invention, the structural units 40 are arranged in a rectangular, L-shaped or circular shape by a plurality of grids (e.g., but not limited to grids X, Y and Z). The invention does not limit the shape of the structural unit 40, but the structural unit 40 should have at least two grids, so as to have the function of filtering noise.

The invention is characterized by providing a method for detecting defects of a semiconductor substrate or a photomask. The method includes four steps, namely: 1. alignment step, 2. affine transformation step, 3. color difference comparison step 4. noise filtering step. Using the above four steps, the photographed color images of the semiconductor substrate or photomask can be converted into color values (such as R value, G value and B value) arranged in a plurality of coordinate grids, and the color values in each coordinate grid are compared with the values of a standard image respectively. Therefore, the manufacturer can find out the defects that are not easy to find in the case of specific colors, and it has better accuracy than the gray-scale color difference comparison method. In addition, in the noise filtering step, the erosion step and the dilation step are performed in sequence, which is helpful to effectively eliminate noise and avoid misjudgment of the defect detection system. To sum up, the invention has the advantages of saving labor cost, being compatible with the prior art, improving product yield and the like.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for detecting defects in a semiconductor substrate, comprising:

providing a substrate, wherein the substrate comprises at least one alignment mark;

capturing the substrate to obtain a color image, wherein the color image comprises at least a first alignment mark;

inputting the color image into a system, and respectively retaining a red value (R value), a green value (G value) and a blue value (B value) of the color image, so as to respectively convert the color image into three images, the three images comprises a red image, a green image and a blue image; and performing a color difference comparison step, respectively comparing the red image, the green image and the blue image with a standard red image, a standard green image and a standard blue image, and finding out the color difference regions on the red image, the green image and the blue image, wherein the color difference comparison step further comprises:

defining a plurality of coordinate regions on the red image and the standard red image respectively;

performing step A: sequentially comparing whether the color difference of the red values (R values) of each coordinate region on the red image and each coordinate region on the corresponding standard red image exceeds a set value;

if the result of the above step A is yes, marking the coordinate region as a red defect grid;

if the result of the above step A is no, the coordinate region is marked as a safe region.

2. The method for detecting defects in a semiconductor substrate according to claim 1, wherein the standard red image, the standard green image and the standard blue image each include at least one second alignment mark.

3. The method for detecting defects in a semiconductor substrate according to claim 2, further comprising performing an alignment step of aligning the at least one first alignment mark on the red image, the green image and the blue image with the at least one second alignment mark respectively included in the standard red image, the standard green image and the standard blue image.

4. The method for detecting defects in a semiconductor substrate according to claim 3, wherein the alignment step is performed before the color difference comparison step.

5. The method for detecting defects in a semiconductor substrate according to claim 4, wherein the substrate contains four alignment marks, and the four alignment marks are arranged in a rectangular or square shape.

6. The method for detecting defects in a semiconductor substrate according to claim 5, further comprising performing an affine transformation step, wherein the affine transformation step comprises correcting the four first alignment marks on the color image to be arranged in a rectangle or a square shape.

7. The method for detecting defects in a semiconductor substrate according to claim 6, wherein the alignment step is performed first, then the affine transformation step is performed, and then the color difference comparison step is performed.

8. The method for detecting defects in a semiconductor substrate according to claim 1, wherein the color difference comparison step further comprises:

defining a plurality of coordinate regions on the green image and the standard green image respectively;

performing step B: sequentially comparing whether the color difference of the green values (G values) of each coordinate region on the green image and each coordinate region on the corresponding standard green image exceeds a set value;

if the result of step B is yes, marking the coordinate region as a green defect grid;

if the result of the above step B is no, the coordinate region is marked as a safe region.

9. The method for detecting defects in a semiconductor substrate according to claim 8, wherein the color difference comparison step further comprises:

defining a plurality of coordinate regions on the blue image and the standard blue image respectively;

performing step C: sequentially compare whether the color difference of the blue value (B value) of each coordinate region on the blue image and each coordinate region on the corresponding standard blue image exceeds a set value;

if the result of step C is yes, marking the coordinate region as a blue defect grid;

if the result of the above step C is no, the coordinate region is marked as a safe region.

10. The method for detecting defects in a semiconductor substrate according to claim 9, further comprising:

arranging the red defect grid, the green defect grid and the blue defect grid in a coordinate shape to form a defect coordinate axis, wherein the defect coordinate axis is composed of a plurality of defect grids; and performing a noise filtering step to remove one or more defect grids in the defect coordinate axis.

11. The method for detecting defects in a semiconductor substrate according to claim 10, wherein the noise filtering step further comprises an erosion step and a dilation step in sequence.

12. The method for detecting defects in a semiconductor substrate according to claim 11, wherein the erosion step comprises:

selecting a structural unit, which is composed of a plurality of grids;

overlapping and comparing any one of the grids of the structural unit with each defect grid of the defect coordinate axis in sequence, and keeping the intersection of the defect coordinate axis and the grid of the structural unit, deleting the non-intersection grid of the defect coordinate axis and the structural unit, and defining the defect coordinate axis after deleting the non-intersection grid as a first defect coordinate axis.

13. The method for detecting defects in a semiconductor substrate according to claim 12, wherein the expanding step comprises:

overlapping and comparing any one of the grids of the structural unit with each of the defect grids of the first defect coordinate axis in sequence, and keeping the union of the first defect coordinate axis and the grid of the structural unit.

14. The method for detecting defects in a semiconductor substrate according to claim 12, wherein the plurality of plurality of grids of the structural unit is arranged in a rectangular, L-shaped or circular shape.

* * * * *